Jan. 5, 1954    W. STEIN ET AL    2,664,796
CURTAIN SHUTTER CAMERA WITH FLASH SYNCHRONIZING DEVICE
Filed Jan. 17, 1951
Fig.1
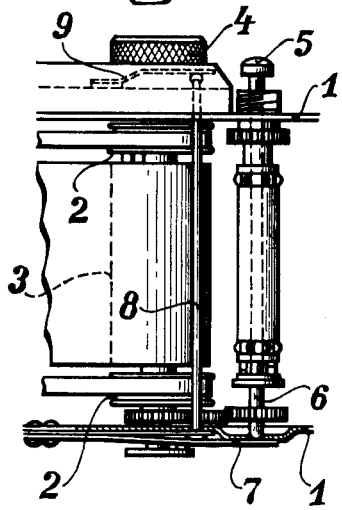
Fig.2 A÷A
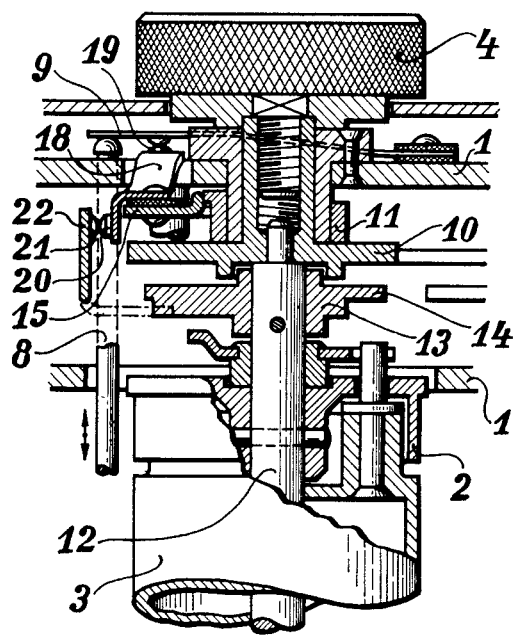
Fig.4
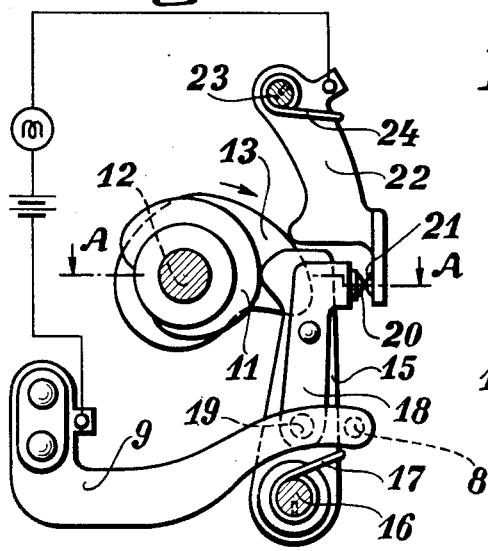
Fig.3
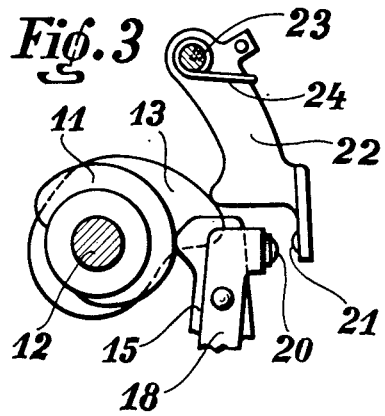
INVENTORS.
Wilhelm Stein
BY Friedrich Gath
Fred A. Klein
their Attorney

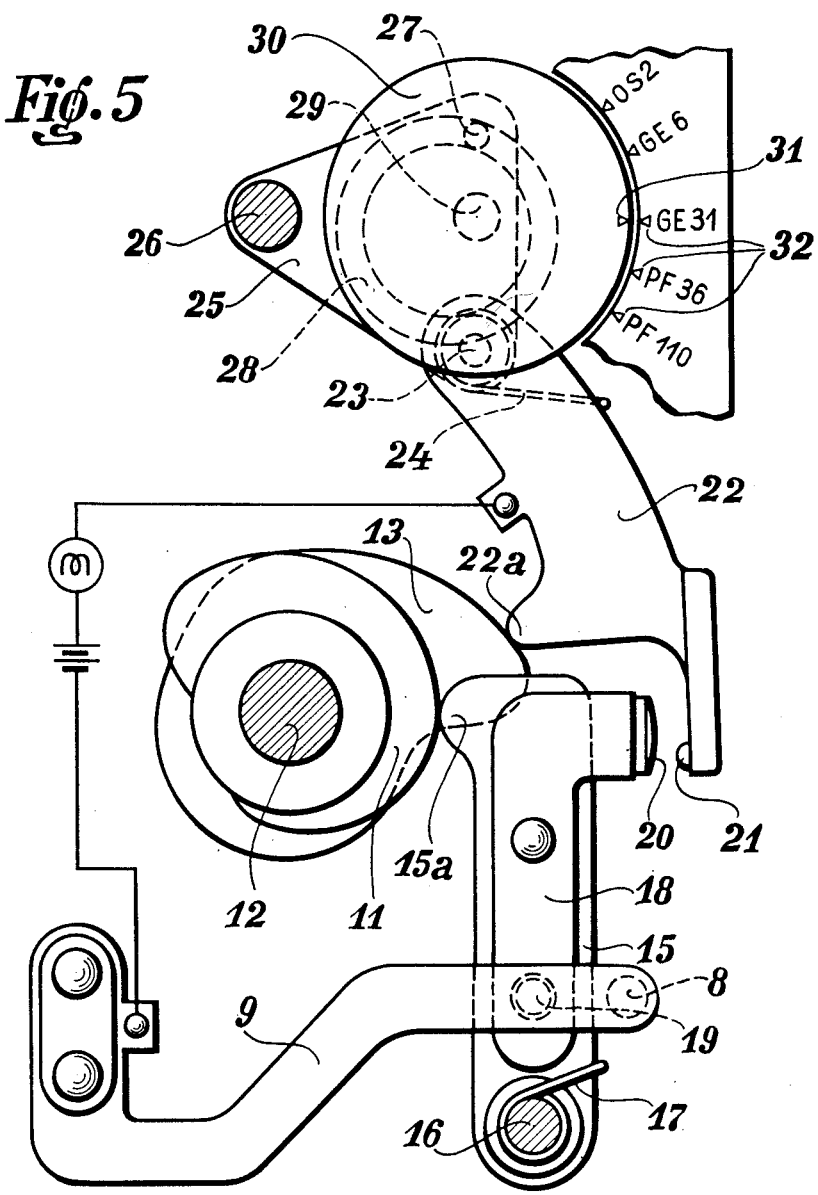

Patented Jan. 5, 1954

2,664,796

UNITED STATES PATENT OFFICE 2,664,796

CURTAIN SHUTTER CAMERA WITH FLASH SYNCHRONIZING DEVICE

Wilhelm Stein, Wetzlar (Lahn), and Friedrich Gath, Altenkirchen ub. Weilburg, Germany, assignors to Ernst Leitz, G. m. b. H., Wetzlar, Germany, a corporation of Germany Application January 17, 1951, Serial No. 206,342
Claims priority, application Germany
February 9, 1950

4 Claims. (Cl. 95—11.5)

The present invention relates to a device for synchronizing a photo-flash with a camera shutter, and is particularly applicable to focal plane shutters.

It is known to effect the ignition of photographic flash bulbs by actuating contacts which are controlled by the release member of the shutter. Known mechanisms of this type do not make it possible, however, to synchronize the flash in accordance with different exposure times so that such ignition devices can be used, in practice, only for a predetermined exposure which must be adapted to that of the flash. It is also known to effect photo-flash ignition by means of certain parts of the unwinding shutter. In the latter devices, synchronization is adaptable to different flash types but they also fail to provide means for adapting it to the different, adjustable exposure times of the camera. For these reasons, the known synchronization devices are not fully satisfactory in connection with modern flash techniques which work with considerably increased light intensities at shorter ignition and combustion times.

Present-day photography frequently makes use of flash bulbs even during daylight, and under such conditions it is imperative to harmonize the shutter speed and the intensity and combustion time of the flash so as to avoid double exposure to day and flash light.

It is the principal object of the present invention to provide improved flash synchronization means in a focal plane shutter camera.

It is a more particular object of this invention to provide photo-flash synchronization means adapted to secure split-second adaptation of exposure time, intensity and duration of the flash.

The disadvantages of prior devices are overcome and the above and other objects are accomplished in accordance with the invention by providing a synchronization mechanism comprising an ignition circuit having first contact means controlled by the shutter release member, and second contact means including two camming means actuated by the unwinding shutter and by the shutter speed control means, respectively, and two contact levers actuated by respective ones of said camming means and adapted to close the ignition circuit upon contact with each other. The camming means include actuating curves, and a particularly dependable and sensitive control of the ignition contacts is effected if the actuating curve controlled by the speed control means traverses a comparatively large actuating path with relatively small increase in curvature, while the actuating curve controlled by the shutter traverses a relatively short actuating path with comparatively large increase in curvature.

In a synchronization device according to the invention, the closing of the first contact means controlled by the shutter release member establishes the ignition readiness of the mechanism but does not and cannot cause ignition since it fails to close the circuit. The connection of one of the contact levers forming part of the second contact means with the speed control means makes it possible to adjust the moment of ignition in relation to and dependent on the predetermined exposure time. The control of the second contact lever by the unwinding shutter assures the dependence of the moment of ignition of the actual opening of the shutter aperture. The flash will be ignited only when the two contact levers make contact.

In a preferred embodiment of the flash synchronization device for a focal plane shutter camera in accordance with the invention, the speed control means which remains fixed during the unwinding of the shutter is arranged coaxially with the common axis of rotation of the curtain roller and the band rollers, the actuating curves are parts of camming discs one of which is connected with the speed control means and the other is connected with the band rollers of the leading shutter curtain, and each of the contact levers associated with a respective camming disc is supported in the camera in pivotal relation to the above-named axis of rotation and carries at its end contact elements adapted to make contact with each other. In this embodiment of the invention, the first contact means may comprise a contact spring which is actuable by the shutter release member in relation to a fixed contact element, said element being connected to the contact lever which is controlled by the speed control means. The current conductors of the first contact means and the latter contact lever are insulated from any metallic parts of the camera.

An arrangement in accordance with the above-described preferred embodiment of the invention requires little space and can be built organically into the timing device of the camera. The provision of two actuating cams which are movable independently from each other enable very exact adjustment of the contact positions which is further improved by the arrangement of the actual contact elements on two pivotable contact levers.

The actual form of the actuating curve of the shutter controlled cam will depend on the speed type of the shutter curtains, i. e. its form will be different for shutter curtains moving with constant speed and for accelerated speed curtains so that the velocity of movement of the contact lever actuated by said curve remains constant. The actual form of the other cam curve actuated by the shutter speed control means depends on the form of the shutter controlled curve and also on the arrangement of timing markers on the speed control means.

In one particular embodiment of the invention, the position of the contact lever actuated by the shutter controlled cam curve is adjustable in relation to said curve in accordance with different flash types. The adjusting means may consist of a setting-disc provided with an eccentric groove engaging the axle of said contact-lever. Preferably, the setting-disc may be provided with a pointer adapted to be set along different flash type markings fixedly arranged on the housing of the camera.

The above objects, features and advantages of the present invention will become more apparent from the following detailed description of a preferred embodiment, taken in conjunction with the accompanying drawing, in which Fig. 1 shows, in elevation, part of a focal plane shutter arrangement of a camera;

Fig. 2 shows, in section, an enlarged view of the shutter and synchronization arrangement, partly along line A—A of Fig. 4;

Fig. 3 shows the contact means of Fig. 4 before closing the ignition circuit; and Figs. 4 shows, in elevation, the ignition circuit and contact means of the flash synchronization mechanism according to the invention;

Fig. 5 shows, in elevation, an enlarged view of the ignition circuit and contact means of the flash synchronization mechanism provided with setting means for the shutter-controlled contact-lever according to the invention.

Referring now to the drawings, there is shown camera casing 1 enclosing coaxially arranged band rollers 2 of the leading curtain and curtain rollers 3 of the following curtain of a focal plane shutter. Speed control knob 4 is arranged externally of the camera housing. Contact blade 9 of the first contact means of the ignition circuit is adapted to be actuated by shutter release member 5 by means of release shaft 6, leaf spring 7 and reciprocable shaft 8.

Referring more particularly to Fig. 2, speed control knob 4 is shown to carry contact actuating cam 11 coaxially with the time actuating cam 10, while axle 12 which is fixedly connected to band rollers 2 carries contact actuating cam 13 which is operated by the unwinding shutter curtain. Actuating cam 13 is also coaxially connected with control cam 14 which determines the release of the second curtain.

Contact actuating cam 11 cooperates with contact lever 15 which is pivotally supported on axle 16 in the camera casing and is under pressure of spring 17. Contact lever 15 is provided with contact blade 18 which, with contact portion 19, is adapted to make contact with contact blade 9 and, with contact portion 20 at its other end, is adapted to make contact with contact portion 21 of contact lever 22. Lever 22 is also pivotally supported in the camera casing around axle 23 and is under pressure of spring 24 which presses lever 22 against contact actuating cam 13 (see particularly Fig. 4).

As shown in Figs. 3, 4 and 5, the change of pitch or slope of camming curve 11 is distributed substantially over the entire circumference of the curve, while the effective change of pitch in camming curve 13 is restricted to a small part of the circumference, i. e. about 90° thereof. Also, the stroke of cam 11 is considerably smaller than that of cam 13.

Referring to Fig. 5, axle 23 of shutter-controlled contact lever 22 is arranged on rocking member 25 pivotally supported on axle 26 and provided with a pin 27. The pin 27 engages a groove 28 eccentrically arranged on a setting-disc 30 pivotally supported on axle 29. Setting-disc 30 is provided with setting-pointer 31 which may be set opposite any of marks 32 representing different types of flashlamps. Marks 32 are arranged on the camera-housing.

Contact 20 of contact-lever 15 has a large surface, allowing for the positional adjustment of contact 21 of contact-lever 22 without disengaging contacts 20, 21 from each other. Surface of cam 13 actuating feeling nose 22a of contact-lever 22 has been determined for accelerated velocity of shutter-curtains so that contact 21 obtains constant velocity.

By setting disc 30 in accordance with setting-marks 31, 32, feeling nose 22a is moved along surface of cam 13, and therefore the ignition-point of the flash-lamp is determined in accordance with the chosen type of flash-lamp.

The synchronization device of the invention, as described above in a preferred embodiment thereof, operates as follows:

When timing knob 4 is adjusted to the desired shutter speed, cam 11, which is connected with the knob, automatically moves contact lever 15 to a predetermined position. When the shutter is tensioned by rolling up the second curtain roller 3 and the bands of the first curtain on band rollers 2, cam 13 is actuated and moves contact lever 22 to a predetermined position relative to axle of rotation 12. Therefore, when the shutter is tensioned, contact elements 20 and 21, carried respectively by levers 15 and 22, are in positions which are accurately defined by the positions of the two cams relative to each other.

Upon release of the shutter, the first contact 9, 19 connected in series in the ignition circuit (see Fig. 4) is closed by means of release shaft 6, leaf spring 7 and reciprocable shaft 8. The unwinding of the leading curtain causes rotation of cam 13 which is connected therewith and, in accordance with the pre-set position of the actuating curve of cam 13, contact lever 22 is released and closes the contact 20, 21. The closing of this contact completes the ignition circuit and causes ignition of the flash. Thus, the path of contact elements 20 and 21 is determined not only by the adjustment in relation to the unwinding curtain (element 21) but also by the adjustment in relation to different exposure times adjustable by timing knob 4 (element 20). Therefore, the actual moment of ignition of the flash depends on both of these factors.

Upon return of the shutter release member to its original position, contact 9, 19 is automatically opened by means of leaf blade 7 and reciprocable shaft 8. This results in the interruption of the ignition circuit even if the contact 20, 21 remains closed as the result of the unwinding shutter curtain. When the shutter is tensioned again, the cam 13 is returned to its original position whereby lever 22 is readied for the next contact while contact 20, 21 is simultaneously opened.

The synchronization mechanism in accordance with a preferred embodiment of the invention has been described hereinabove in connection with a focal plane shutter camera whose timing knob effects a circular path for exposure timing but which stands still during unwinding of the shutter. However, it is also possible to control the synchronization by means of a linearly moving timing means, such as an exposure lid. It is also within the scope of the invention to use the synchronization mechanism in connection with an objective shutter. In the latter modification, the timing knob is replaced by the shutter speed ring of the objective shutter, said ring serving to control the camming curve 11, and camming curve 13 being actuated by an element adapted to operate the shutter disc.

While the invention has been described and illustrated in connection with a preferred embodiment thereof, it is to be clearly understood that various modifications falling within the spirit and scope of the invention may occur to the skilled in the art. We, therefore, intend to be limited only by the appended claims.

What is claimed is:

1. In a photo-flash synchronization mechanism combined with a focal plane shutter camera comprising a shutter release member and a shutter speed control member, said mechanism comprising an electric circuit for igniting a flash-lamp and first contact means in said circuit controlled by the shutter release member: second contact means in said circuit, said second contact means including two levers carrying electrical contact elements, a first cam operatively connected to the shutter speed control member and arranged to position one of said levers in accordance with the setting of the speed control member, and a second cam operatively connected to the shutter and arranged to actuate the other of said levers upon unwinding of the shutter, said other lever being provided with a feeler element in contact with said second cam, and setting means being provided for moving the feeler element along the curvature of said second cam and thereby to change the stroke of this lever, the setting means being adjustable in accordance with a scale representing different flash types, and the closing of the ignition circuit being effected when said first contact means is closed by the shutter release member and when said second contact means is closed upon contact between said contact elements carried by the said levers.

2. The synchronization mechanism as defined in claim 1, wherein the first cam has a circumferential curvature encompassing a comparatively large path with relatively small increase in curvature during positioning of its contact lever, and the second cam comprises a circumferential curvature encompassing a relatively short path with comparatively large increase in curvature during actuation of its contact lever.

3. In a photo-flash synchronization mechanism combined with a focal plane shutter camera having a shutter release member and a shutter speed control member remaining stationary during unwinding of the shutter, said shutter speed control member being coaxially arranged with the common axis of rotation of the curtain rollers, said mechanism comprising an electric circuit for igniting a flash-lamp and first contact means in said circuit controlled by the shutter release member: second contact means in said circuit, said second contact means including two levers carrying electrical contact elements, said levers being supported in the camera in pivotal relation to said common axis of rotation, a first cam operatively connected to the shutter speed control member and whose position is determined by the setting of the speed control member, said first cam being mounted adjacent one of said levers and the position of said lever being determined by the setting of the first cam, and a second cam operatively connected with the rollers of the leading shutter curtain, said second cam being mounted adjacent the other of said levers and actuating said other lever upon unwinding of the curtain, said other lever being provided with a feeler element in contact with said second cam and setting means being provided for moving the feeler element along the curvature of said second cam and thereby to change the stroke of this lever, the setting means being adjustable in accordance with a scale representing different flash types, and the closing of the ignition circuit being effected when said first contact means is closed by the shutter release member and when said second contact means is closed upon contact between said contact elements carried by said levers.

4. The synchronization mechanism as defined in claim 3, wherein the first cam has a circumferential curvature encompassing a comparatively large path with relatively small increase in curvature during positioning of its contact lever, and the second cam comprises a circumferential curvature encompassing a relatively short path with comparatively large increase in curvature during actuation of its contact lever.

WILHELM STEIN.
FRIEDRICH GATH.

References Cited in the file of this patent

UNITED STATES PATENTS

| Number | Name | Date |
|---|---|---|
| 2,517,407 | Nilsen | Aug. 1, 1950 |
| 2,520,638 | Hulstein | Aug. 29, 1950 |
| 2,552,213 | Pribus et al. | May 8, 1951 |
| 2,590,829 | Wagner | Mar. 25, 1952 |
| 2,596,671 | Fuerst | May 13, 1952 |

FOREIGN PATENTS

| Number | Country | Date |
|---|---|---|
| 724,336 | Germany | Aug. 24, 1942 |